United States Patent [19]

McTaw, Jr.

[11] Patent Number: 4,546,693
[45] Date of Patent: Oct. 15, 1985

[54] VENT WINDOW ASSEMBLY

[76] Inventor: Johnnie McTaw, Jr., 17185 Bentler, Detroit, Mich. 48219

[21] Appl. No.: 545,467

[22] Filed: Oct. 26, 1983

[51] Int. Cl.$^4$ .............................................. F24F 7/00
[52] U.S. Cl. ............................................ 98/2; 49/38; 98/2.14; 98/41.3; 98/88.1; 296/152; 296/216
[58] Field of Search .................. 98/2, 2.11, 2.12, 2.14, 98/32, 37, 41 SV, 42 R, 87, 88 R, 88 S, 93, 96, 101; 49/38, 463; 296/84 M, 97 G, 146, 216, 152; 160/37, 104

[56] References Cited

U.S. PATENT DOCUMENTS

| | | | |
|---|---|---|---|
| 1,122,930 | 12/1914 | Horn | 49/38 |
| 1,331,397 | 2/1920 | Stein | 98/98 X |
| 1,409,050 | 3/1922 | Jurisch | 98/96 X |
| 2,322,590 | 6/1943 | Pickering et al. | 49/38 X |
| 2,628,549 | 2/1953 | Stelmach | 98/2.12 |
| 2,751,839 | 6/1956 | Moore | 49/38 X |
| 2,755,728 | 7/1956 | Frisby | 49/463 X |
| 3,073,525 | 1/1963 | Cislo | 98/41 SV |
| 3,389,505 | 6/1968 | Zitomer | 49/463 |
| 3,509,812 | 5/1970 | James | 98/108 X |
| 3,564,770 | 2/1973 | Korbelic | 49/38 |
| 4,057,094 | 11/1977 | Smith | 160/37 |
| 4,363,349 | 12/1982 | Childs | 49/463 |
| 4,407,187 | 10/1983 | Horney | 98/41 SV |

FOREIGN PATENT DOCUMENTS

| | | | |
|---|---|---|---|
| 372050 | 5/1932 | United Kingdom | 296/216 |
| 887183 | 1/1962 | United Kingdom | 98/101 |

Primary Examiner—Harold Joyce
Attorney, Agent, or Firm—Cullen, Sloman, Cantor, Grauer, Scott & Rutherford

[57] ABSTRACT

A vent window assembly or filter comprises a continuous channel frame mountable within an opening in a building for a door or window, or within an opening in a vehicle body at the side, roof or rear window area. A laminate consisting of a pair of transparent sheets of plastic material and an intermediate thin plastic screen is nested and retained within the frame. Each of the sheets have a plurality of vertically spaced rows of longitudinally spaced apertures therethrough of a dimension considerably larger than the screen apertures. The apertures in the sheets are in alignment to permit flow of air therethrough, the screen restricting the flow of dirt particles and insects. A vent closure sheet of transparent material is slidably mounted within the frame snugly engaging one of the sheets having therein a corresponding series of similar apertures aligned with the sheet apertures and adjustable for progressively displacing its apertures relative to the laminate apertures for closing off the flow of air.

4 Claims, 9 Drawing Figures

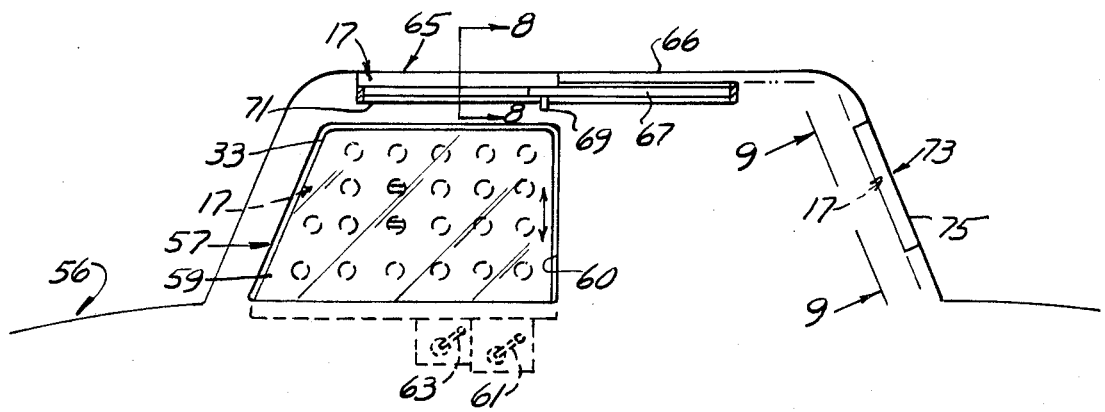
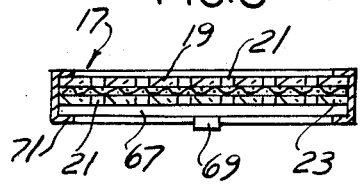
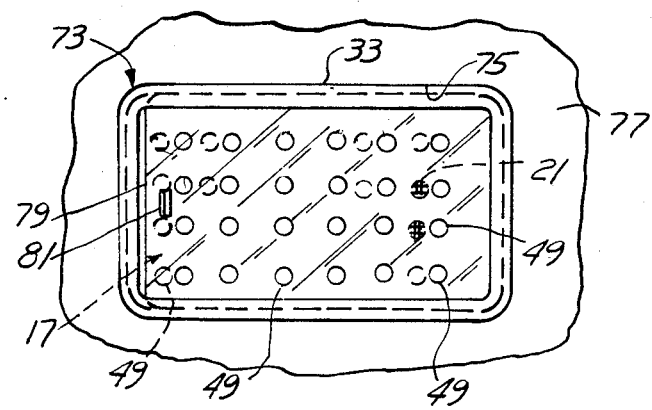

4,546,693

VENT WINDOW ASSEMBLY

BACKGROUND OF THE INVENTION

Heretofore in a screen assembly for a window or a door, there is no known control for closing off passage of air through the screen, except by closing the window or using a storm window mounted upon the inside or exterior of the screen assembly. Heretofore, screens have been employed upon the interior of a vehicle window with the flow of air therethrough controlled by raising or lowering the window as desired cutting-off air flow or progressively decreasing air flow through the screen. The disadvantage of this construction is that unless the window is substantially closed to prevent rain from entering the vehicle, very little ventilating air can through the screen. Heretofore in connection with window vents in the roofs of vehicles, it is known to employ a screen mounted within a suitable frame within the vehicle roof so that upon progressive opening of the closure window, controlled amounts of air can flow into the interior of the car through the roof vent.

THE PRIOR ART

Laminates with screens and window assemblies are shown in one or more of the following patents:

| NUMBER | NAME | DATE |
| --- | --- | --- |
| 2,322,582 | H. R. Marini | June 22, 1943 |
| 2,332,373 | G. L. Dorough et al | October 19, 1943 |
| 2,551,796 | J. R. Fitzpatrick et al | May 8, 1951 |
| 2,787,570 | De Forest Lott et al | April 2, 1957 |
| 2,849,762 | D. C. McCarthy | September 2, 1958 |
| 3,186,893 | F. B. Mercer | June 1, 1965 |
| 3,692,015 | Chase et al | September 19, 1972 |
| 4,248,320 | Raymond L. Wheeler | February 3, 1981 |
| 4,173,668 | Walther E. Hentzelt | November 6, 1979 |
| 4,081,581 | Harry E. Littell, Jr. | March 28, 1978 |
| 4,232,620 | Milton Kurz | November 11, 1980 |
| 4,256,793 | Daniel L. Cannady, Jr. | March 17, 1981 |
| 4,321,777 | Jacques Sauret | March 30, 1982 |

SUMMARY OF THE INVENTION

An important feature of the present invention is to provide a vent window assembly which comprises a continuous channel frame mountable within an opening in a building or within an aperture in a vehicle body including the door, the roof or the rear window area and wherein a pair of sheets of transparent material and an intermediate screen of small mesh are snugly laminated together and nested within the frame and wherein each of the sheets have a plurality of spaced rows of longitudinally spaced apertures therethrough of a dimension larger than the screen apertures wherein the apertures of the sheets are opposed and in alignment for permitting maximum flow of ventilating air therethrough with the screen restricting the flow of dust particles and passage of insects.

As a further feature the screen is thin with respect to the thickness of the apertured sheets forming a part of the vent window assembly.

As a further feature, the sheets are of a transparent plastic material and the screen is a plastic mesh.

A further feature includes a storm window sheet, of transparent imperforate material peripherally nested within the frame upon one side thereof and with clamp means upon the frame retainingly engaging the storm window sheet.

A further feature includes a vent closure sheet of transparent material which is slidably and adjustably mounted within the frame snugly engaging one of the apertured sheets. The closure sheet has a plurality of rows of spaced apertures therethrough corresponding to and of the same size as the sheet apertures. In one position of the closure sheet its apertures are in registry with the laminate apertures and in a second position of the closure sheet its apertures are laterally displaced from the sheet apertures for adjustably closing selectively and blocking air flow through the laminate.

As a further feature the frame and the laminate therein are nested within the body of a vehicle having a vertically adjustable side window positioned outwardly thereof, whereby manually raising and lowering of the side window progressively closes and opens the laminate apertures for controlling the flow of ventilation air.

As another feature a regulator assembly upon the vehicle door is connected to the vent window assembly for lowering the vent window assembly down into the vehicle door or body.

Another feature is the incorporation of the present vent window assembly within the roof or rear window of a vehicle. There is provided in addition to the laminate of the apertured sheets and the plastic mesh therebetween, of a control closure with similar apertures which in one position blocks off the flow of air through the apertures in the laminate and in another position progressively or fully closes-off such apertures.

Another feature of the present invention is to provide an improved air filter assembly for use in conjunction with a heating system including a heating duct and wherein the present channel frame for the vent assembly is mounted within and transversely of a duct and includes a pair of spaced sheets which are apertured throughout, with the apertures arranged in longitudinally spaced rows and with the apertures of the respective sheets in substantial alignment and wherein a filter assembly includes a channel frame mounting a mass of compacted filter material, and is interposed between the apertured sheets and which upon becoming dirty can be removed for replacement.

These and other objects and features will be seen from the following Specification and claims in conjunction with the appended drawings.

THE DRAWINGS

FIG. 7 is a fragmentary schematic view of a portion of a vehicle body illustrating the use of a vent window assembly upon the side of the vehicle, within the roof or within the rear window opening thereof.

FIG. 8 is a fragmentary on an increased scale taken in the direction of arrows 8—8 of FIG. 7.

FIG. 9 is an elevational view taken in the direction of arrows 9—9 of FIG. 7 and on an increased scale.

It will be understood that the above drawings illustrate several embodiments of the invention and that other embodiments are contemplated within the scope of the claims hereafter set forth.

DETAILED DESCRIPTION OF AN EMBODIMENT OF THE INVENTION

Figure 1:
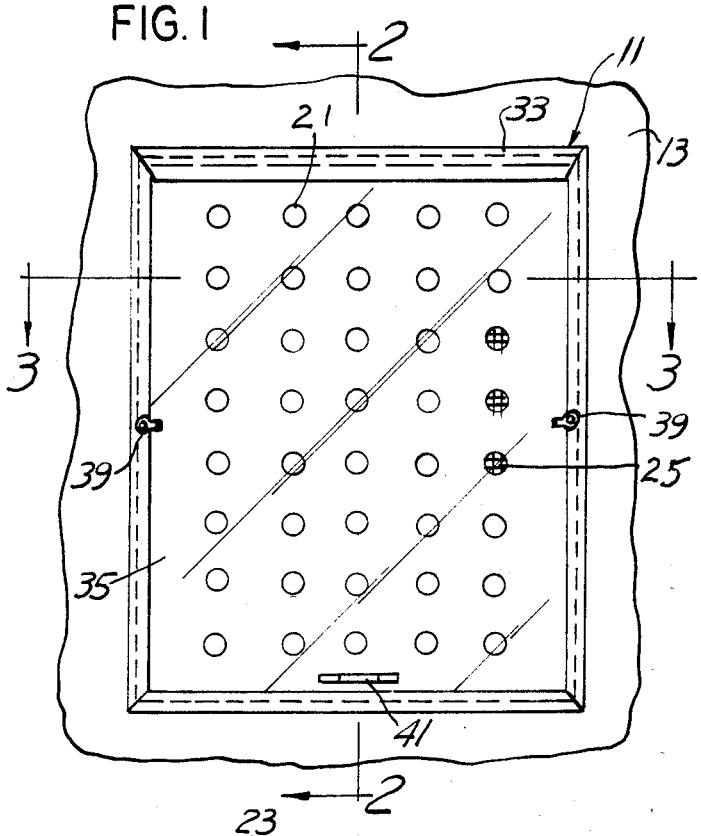
FIG. 1 is a front elevational view the vent window assembly with a storm window applied thereto, a portion of a building wall being fragmentarily shown.
Figure 2:
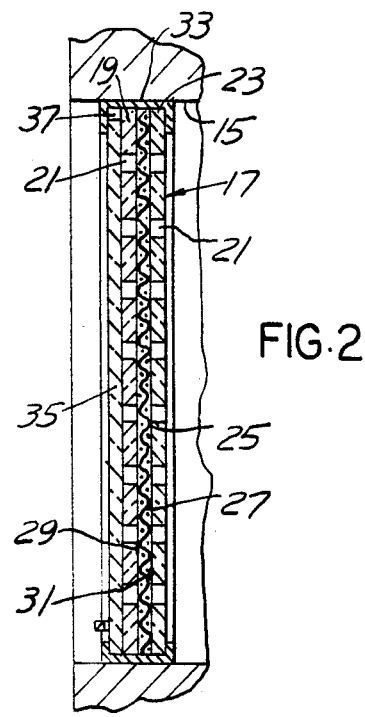
FIG. 2 is a section taken in the direction of arrows 2—2 of FIG. 1.

Referring to the drawings, a vented window assembly is generally indicated at 11, FIG. 1, including a continuous channel frame 33 mountable within an aperture 15 within a building 13, FIG. 2, or in a vehicle 56, FIG. 7. Vent window assembly 17, FIG. 2, is a laminate which includes a first sheet 19 of a transparent material, such as plastic, glass or plexiglass or a polycarbonate. Formed or cut through sheet 19 throughout most of its area, are vertically spaced rows of longitudinally spaced vent apertures 21.

Spaced therefrom is a second sheet 23 of similar material which has formed therethrough vertically spaced rows of longitudinally spaced vent apertures 21. The corresponding apertures 21 of the respective sheets 19 and 23 are laterally aligned and opposed to each other.

A continuous screen 25, preferably of plastic material, and of relatively small mesh in comparison with apertures 21 in the first and second sheets, is interposed between and laminated to the corresponding first and second sheets. Said sheets are secured together as a unit by the application of an adhesive and pressure to form the present vent window assembly, sometimes hereafter referred to as laminate 17 mounted and nested within frame 33. The apertures 27 of screen 25, which is preferably plastic, are considerably smaller than apertures 21. Though exaggerated in the drawing, the thickness of screen 25 is thin relative to the thickness of the corresponding first and second sheets 19 and 23.

As illustrative of one manner of securing the sheets together with the screen laminated therebetween, a layer of glue 29 is applied to the interior of the first sheet 19. A corresponding layer of glue activator 31 is applied to the interior of the second sheet 23, FIG. 2 and with the screen therebetween, the entire assembly is brought together under pressure until the adhesive is cured sufficiently to hold the first and second sheets snugly against the intermediate screen 25. Heat may be applied, if desired to improve the securing and sealing of the two sheets and the intermediate plastic mesh sheet.

This window assembly or laminate 17 is preferably nested and retained with continuous channel frame 33 positioned within the building or vehicle openings 15, FIG. 2.

Figure 3:
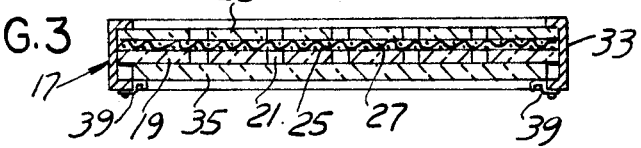
FIG. 3 is a plan section taken in the direction of arrows 3—3 of FIG. 1.

In FIGS. 1, 2 and 3, the present laminate within its channel frame 33 is nested within opening 15 forming a part of a window opening or the opening of a door or screen. Applied to one side of laminate 17, there is provided a storm window sheet 35 which is imperforate and snugly bears against one of the sheets 19 and 23, such as sheet 19 in FIG. 2 and is retained in positon by a plurality of clamps 39.

Within frame 33, FIG. 2, above the storm window 35 is a clearance slot 37. The storm window when secured and retained in position by clamps 39 functions to prevent the passage of any air through laminate 17. On loosening or removal of clamps 39, the storm window 35 is elevated sufficiently into slot 37 so that the entire window may be removed from the frame. Though shown upon one side of the laminate 17 and closely adjacent sheet 19, it is contemplated that the storm window could be mounted within the frame upon its opposite side against the second sheet 23, which may be the interior of a window or screen door.

With reference to the use of the term vent window, it is contemplated as equivalent that the basic laminate 17 may be applied either to a window or a door having a corresponding aperture. Handle 41 is applied to storm window sheet 35 to facilitate assembly and dissassembly from and with respect to channel frame 33, FIG. 2.

Figure 5:
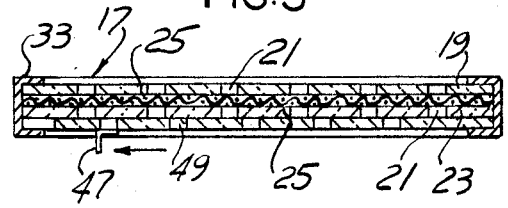
FIG. 5 is a section taken in the direction of arrows 5—5 of FIG. 4.
Figure 4:
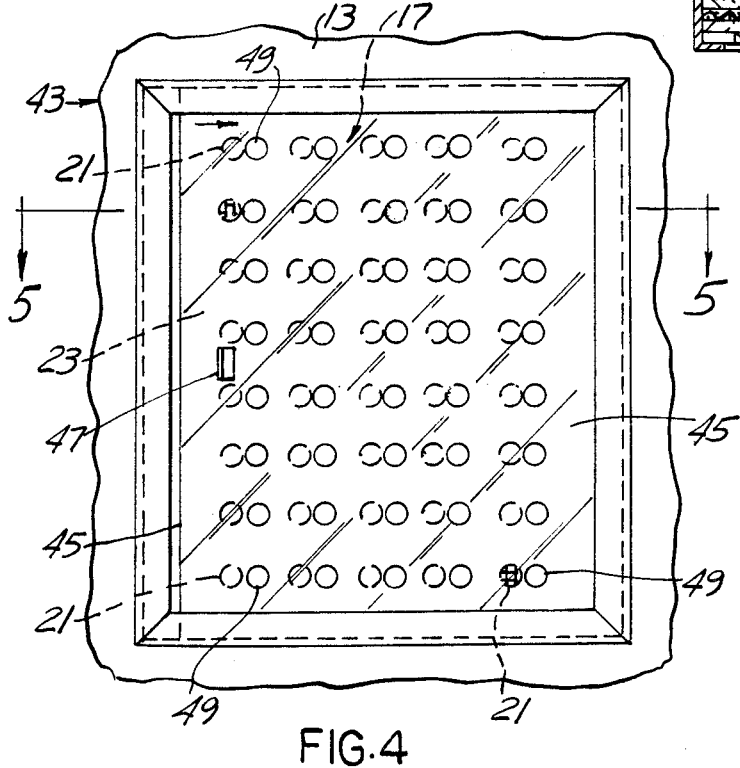
FIG. 4 is a front elevational view of a modified laminate vent window assembly having a similarly apertured control sheet which is adjustable for closing off the laminate apertures.

A modified vent window assembly 43 is shown in FIGS. 4 and 5 and wherein the laminate 17 employed is exactly the same as above described with respect to FIG. 2. Instead, however, of the storm window strip 35 mounted upon the frame 33 and secured thereto, there is provided within the corresponding channel frame 33, a slidably adjustable vent control sheet or control window 45. Said vent closure sheet having a handle 47 has cut or formed therethrough a corresponding series of vertically spaced rows of longitudinally spaced apertures 49 of substantially the same size as apertures 21 within laminate 17. In a normal position of the slide control sheet 45, its apertures 49 are in registry with the corresponding laminate apertures 21 to facilitate the movement of ventilating air through the vent window assembly 17.

When the slide control or closure sheet 45 has been moved laterally within channel 33, a short distance as in FIG. 4, its apertures 49 have been progressively moved and laterally displaced from registry with the laminate apertures 21. On an initial small movement the apertures 21 are partly closed off, or on a further movement a limited distance, FIG. 4, the apertures 49 have been laterally displaced with respect to apertures 21 so as to completely cut-off flow of ventilating air through the vent window assembly 43, FIG. 4. As shown in FIG. 5, the control window or closure sheet 45, is closely adjacent apertured sheet 23 so that the interior surface portion of closure sheet 45 seals against apertured sheet 23. The retraction to the left of FIG. 4 of the slide control sheet 45, a limited distance within frame 33 will again bring the closure apertures 49 into registry with corresponding apetures 21 of the two sheets 19 and 23 for the passage of air therethrough.

Figure 6:
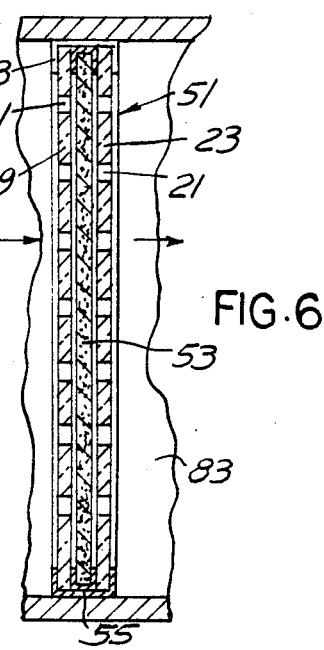
FIG. 6 is a view similar to FIG. 2 showing the use of the present vent assembly as a filter in a heating system.

A modified air filter assembly 51 is fragmentarily shown in FIG. 6 including the present channel frame 33 extending across and mounted through hot air duct 83, fragmentarily shown. The filter assembly includes corresponding first and second sheets 19 and 23 which are laterally spaced apart and which have the corresponding enlarged apertures 21 wherein the apertures are in vertically spaced rows of longitudinally spaced apertures arranged in substantial alignment. Said apertures permit the passage of pressurized hot air or return air through duct 83.

Interposed between apertured sheets 19 and 23 is a removable filter assembly 53 which consists of a planer form of compacted porous filter material of plastic, rock wool or fiberglass, being a conventional filter medium, which is peripherally retained within a corresponding channel frame 55. The filter material is nested between apertured sheets 19 and 23 and normally positioned to filter the air passing through hot air duct 83 or return duct. When the filter becomes dirty, the filter frame 55 and the filter material 53 therein may be removed for cleaning or for replacement.

A modified door window assembly 57, schematically shown in FIG. 7, includes the basic vent window assembly or laminate 17 nested within a channel frame 33, the same as above described with respect to FIGS. 2 and 3, but wherein no storm window is applied.

In this emobidment, the vent window assembly is arranged outwardly of door window 59. Said window is of conventional construction and may be raised and lowered with respect to the vent window assembly 17 within its frame 33 by conventional window regulator 61.

Instead of the laterally sliding control window 45 shown in FIG. 4, the conventional side window 59 in the vehicle body or forming a part of the door, for illustration, may be lowered by the regulator 61 so as to progressively open the vent window assembly 17 within its frame 33 to permit the passage of ventilating air to the interior of the vehicle through the aligned sheet apertures 21.

It is contemplated that for the vent window assembly 17 within frame 33 as shown in FIG. 2, said unit assembly and frame may be positioned within suitable guides within the door or vehicle body such that the entire assembly may be raised and lowered utilizing a manually operable regulator 63, FIG. 7.

The construction of the regulator 63 for the vent window assembly 17 and its frame is substantially similar to the regulator 61 for raising and lowering window 59 and a detailed description is omitted since this is a conventional construction well known in the art. The unit vent assembly 17 with its frame 33 may be raised and lowered with respect to the window opening 60 within the vehicle door or body, whether or not the conventional vertically adjustable window 59 is utilized.

It is furthermore contemplated that whether or not the window 59 is employed, the assembly of the vent window laminate 17 FIG. 7, may be substantially the same as that shown in FIGS. 4 and 5 and wherein the control for the opening up or variably closing of apertures 21 through the sheets 19 and 23 may be slide control strip or sheet 45. Said sheet will move its apertures 49 from registry with the apertures 21 or laterally offset so as to close said apertures as in FIGS. 4 and 5.

A modified roof window assembly 65 in shown in FIG. 7 and is applied to a corresponding aperture within the roof 66. Here the complete vent window assembly 17 within a channel frame 33 is nested and sealed within a corresponding aperture in the vehicle roof 66 and is substantially flush with the roof. Retractable slide control imperforate window 67 is slidably positioned within a second channel frame 71. Said secondary channel frame is normally spaced below the horizontally disposed channel frame 33 for the vent window laminate and extends rearwardly thereof a sufficient distance so that control window 67 may be manually retracted, FIG. 7. In bad weather conditions, rain or snow, slide window 67 may be advanced forwardly in sealing engagement within the vehicle roof and with respect to vent window assembly or laminate 17 such as to close-off and provide a moisture type seal with respect thereto.

While the closure window 67, 69 is shown vertically displaced below vent window laminate 17, it is contemplated that the positions could be reversed so that the slide window is above laminate 17 and sealed with respect thereto and also further sealed in a conventional manner within an opening in the vehicle roof 66, as is well known.

Thus, as is normal in the art, in addition to providing retractable closure window 67, sealed within the plane of the vehicle roof 66, there is additionally applied thereto the present vent window assembly or laminate 17. The control of the retractable control window 67 is shown on an enlarged scale in FIG. 8.

Rear vent window assembly 73 is further shown in FIG. 7 normally positioned within the rear window and more particularly within the window opening 75 at the rear of the vehicle, FIG. 9.

There may be a pair of said rear vent window assemblies 73 laterally spaced and positioned within opening 75 for the rear window of the vehicle. The remainder of the space within that window area is scaled by a conventional glass window for those areas not covered by the rear vent window assembly 73.

In this embodiment, the body rear portion 77 has an aperture therein to cooperatively and sealingly receive the vent window assembly 17 within its peripheral frame 33, wherein there is provided within the laminate 17, the same apertured inner and outer sheets 19 and 23. Slidable control window 79 is peripherally and guidably mounted within channel frame 33 upon the interior thereof and includes handle 81. The control window 79 has a corresponding series of apertures 49 having an arrangement and spacing the same as apertures 21 within sheets 19 and 23. In a closed position, apertures 49, the same as above described with respect to FIG. 5 are laterally displaced so as to block off the passage of air through apertures 21 in the vent window assembly 73.

With the control window 79 displaced from the position shown in FIG. 9, such as to the left, its control apertures 49 will be in registry with the laminate apertures 21 to permit controlled flow of ventilating air through the vent assembly 17 incorporated into embodiment 73, FIG. 9.

Having described my invention, reference should now be had to the following claims.

I claim:

1. A vent window assembly comprising a continuous channel frame mountable within a building or vehicle aperture;

a pair of sheets of transparent material and a screen of small mesh snugly laminated and secured between said sheets, nested and retained within said frame;

each of said sheets having a plurality of vertically spaced rows of longitudinally spaced apertures therethrough of a dimension larger than said screen apertures;

the apertures of said sheets being in alignment respectively;

the sheets permitting maximum flow of ventilating air therethrough, the screen restricting the flow of dust particles and insects;

a vent closure sheet of transparent material slidably and adjustably mounted within said frame snugly engaging one of said sheets;

said closure sheet having vertically spaced rows of longitudinally spaced apertures therethrough corresponding to and of the same size as said sheet apertures and in one position of said closure sheet in registry with said sheet apertures and in a second position of said closure sheet laterally displaced from said sheet apertures for adjustably closing selectively and blocking off flow of air through said laminate;

and a handle projecting from said vent closure sheet for controlling sliding movements thereof within said frame to selectively and partly close and fully close off said laminate apertures.

2. A vent window assembly comprising a continuous channel frame mountable within a vehicle aperture;

a pair of sheets of transparent material and a screen of small mesh snugly laminated and secured between said sheets, nested and retained within said frame;

each of said sheets having a plurality of vertically spaced rows of longitudinally spaced apertures therethrough of a dimension larger than said screen apertures;

the apertures of said sheets being in alignment respectively;

the sheets permitting maximum flow of ventilating air therethrough, the screen restricting the flow of dust particles and insects;

said frame being nested and sealed within the rear window opening of a vehicle;

a vent closure sheet of transparent material slidably and adjustably mounted within said frame snugly engaging one of said sheets;

said closure sheet having vertically spaced rows of longitudinally spaced apertures therethrough corresponding to and of the same size as said sheet apertures and in one position of said closure sheet in registry with said sheet apertures and in a second position of said closure sheet laterally displaced from said sheet apertures for adjustably closing selectively and blocking off flow of air through said laminate.

3. A vent window assembly comprising a continuous channel frame mountable within a vehicle aperture;

a pair of sheets of transparent material and a screen of small mesh snugly laminated and secured between said sheets, nested and retained within said frame;

each of said sheets having a plurality of vertically spaced rows of longitudinally spaced apertures therethrough of a dimension larger than said screen apertures;

the apertures of said sheets being in alignment respectively;

the sheets permitting maximum flow of ventilating air therethrough, the screen restricting the flow of dust particles and insects;

said frame being nested and sealed within the roof of a vehicle;

a secondary channel frame nested within said vehicle roof adjacent said first channel frame and extending rearwardly thereof;

and a vent closure sheeet of transparent imperforate material slidably and adjustably mounted within said secondary channel for sealingly engaging said laminate progressively retractable for opening said laminate apertures.

4. A vent window assembly comprising a continuous channel frame mountable within a vehicle aperture;

a pair of sheets of transparent material and a screen of small mesh snugly laminated and secured between said sheets, nested and retained within said frame;

each of said sheets having a plurality of vertically spaced rows of longitudinally spaced apertures therethrough of a dimension larger than said screen apertures;

the apertures of said sheets being in alignment respectively;

the sheets permitting maximum flow of ventilating air therethrough, the screen restricting the flow of dust particles and insects;

said frame being nested and sealed within the roof of a vehicle;

a secondary channel frame nested within said vehicle roof adjacent said first channel frame;

and a vent closure sheet of transparent material slidably and adjustably mounted within said secondary channel sealingly engaging said laminate and progressively retractable for opening said laminate apertures;

said vent closure sheet having vertically spaced rows of longitudinally spaced apertures therethrough corresponding to and of the same size as said sheet apertures and in one position of said closure sheet in registry with said laminate apertures and in a second position of said closure sheet laterally displaced from said first sheet apertures for adjustably closing selectively and blocking off flow of air through said laminate.

* * * * *